United States Patent

[11] 3,558,912

[72] Inventor Edward J. Spall
 Apalachin, N.Y.
[21] Appl. No. 754,750
[22] Filed Aug. 22, 1968
[45] Patented Jan. 26, 1971
[73] Assignee The United States of America as
 represented by the Secretary of the Air
 Force

[54] CIRCUIT FOR PROVIDING NONVOLATILE MEMORY
8 Claims, 9 Drawing Figs.

[52] U.S. Cl. .................................................. 307/202,
 307/238
[51] Int. Cl. .................................................. H02h 7/20
[50] Field of Search .......................................... 307/291,
 202, 238, 282; 317/33; 340/146.1J; 307/92

[56] References Cited
UNITED STATES PATENTS
2,982,870 5/1961 Hilbiber ........................ 307/292
3,214,606 10/1965 Wilson ......................... 307/282

Primary Examiner—Richard A. Farley
Assistant Examiner—William T. Rifkin
Attorneys—Harry A. Herbert, Jr. and Henry P. Wilder

ABSTRACT: A bistable flip-flop circuit having a memory core is designed to return to a preferred state after power failure or radiation burst. A feedback loop from the memory core senses whether the preferred state is the same as the state before power failure or radiation and, if not the same, changes the state of the flip-flop circuit.

INVENTOR.
EDWARD J. SPALL
BY Harry A. Herbert Jr
ATTORNEY

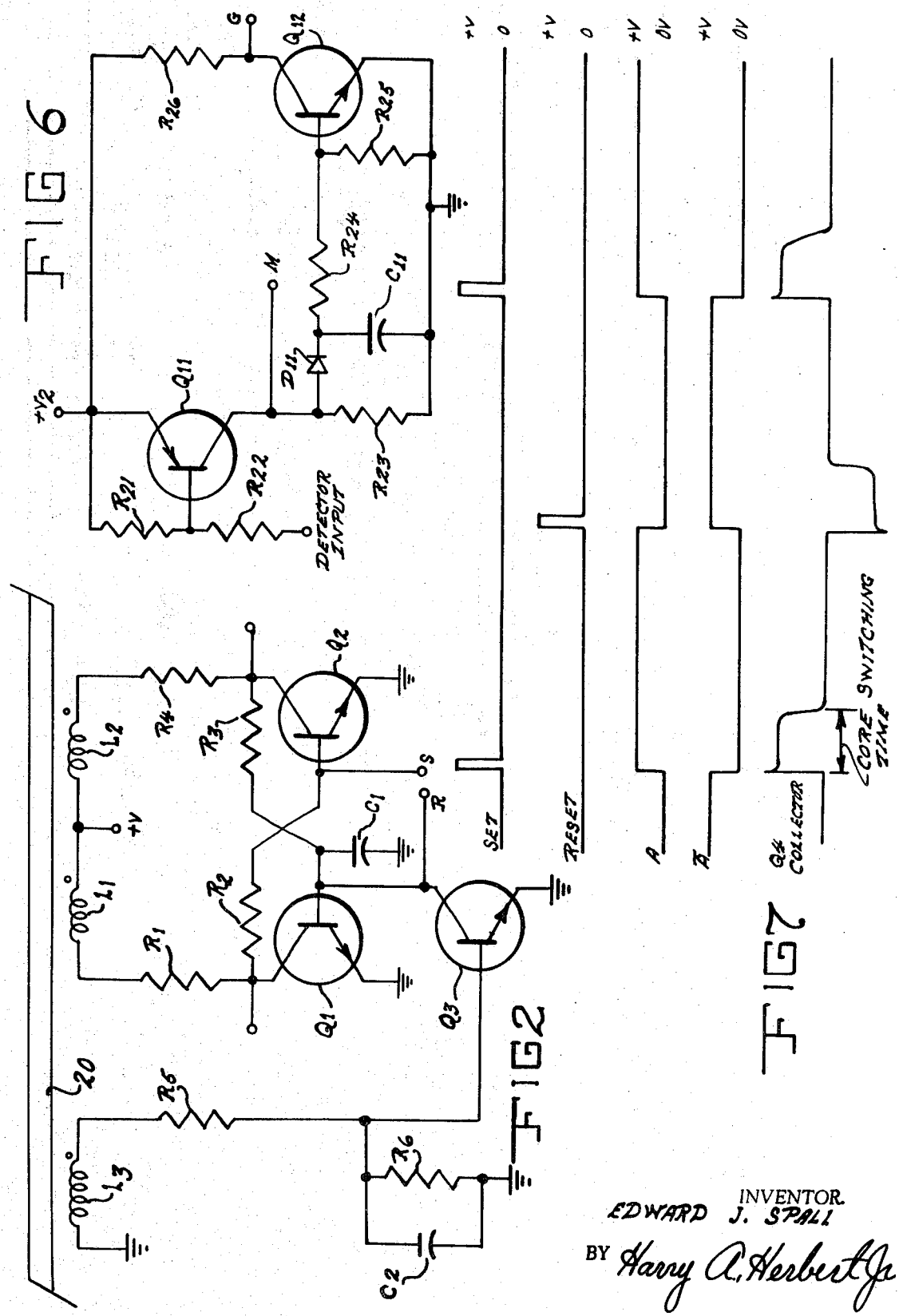

CIRCUIT FOR PROVIDING NONVOLATILE MEMORY

BACKGROUND OF INVENTION

The invention relates generally to bistable electronic circuits and more particularly to a bistable flip-flop circuit which is capable of returning to its last state in the event of a loss of power supply voltage, intense radiation pulses, electromagnetic noise pulses or similar adverse environment.

In a variety of equipment employing switching systems, such electronic computers, a large number of bistable memory circuits or flip-flops are employed, the states of which serve to store information for future use. These circuits are set in one of the two bistable states and retain that state by utilization of the transfer characteristics of the circuit elements and the presence of a constant supply voltage level. The setting of these flip-flop circuits to their desired states often takes a considerable amount of time, and these settings are constantly being changed, depending upon the programming of the equipment and the type of operation performed. If the conventional semiconductor bistable circuit is subjected to nuclear radiation pulses, both output transistors saturate or conduct. Upon the radiation pulse subsiding, the circuit relaxes to one or the other of the two states, but the state after recovery may or may not be the same state of the bistable flip-flop before radiation. If a loss of power should occur, the conventional bistable circuit now used in the art may come to either state when power is restored, because there is no "memory" as to its last energized state. The information stored in these flip-flop circuits would be lost necessitating resetting the circuits and rerunning the desired program when the radiation pulses subside or when power returns.

BRIEF SUMMARY OF INVENTION

The above problems are solved by providing a circuit whereby a nonvolatile memory is achieved. Nonvolatile is meant to be that property in a bistable circuit whereby the state of the circuit is preserved and restored in the event of loss of power supply voltage, intense radiation, electromagnetic noise pulses, or similar pulsed adverse environment. The bistable circuit is designed to initially set itself to a particular one of its states herein called the preferred state, after the adverse condition has passed. A feedback loop senses whether the preferred state is the same as the state before the adverse condition. If it is, the flip-flop is allowed to remain in its preferred state. If it is not, the flip-flop is reversed to its opposite state.

In accordance with another aspect of the invention, a gate is provided to inhibit the inputs to the flip-flop until after the radiation subsides. The gate is controlled by a detector circuit which senses radiation and controls all flip-flops in a system. The feedback loop is normally open but is closed by the detector circuit.

Accordingly, the objects of this invention are to provide a bistable circuit that will return to its last state in the event of a temporary power failure, nuclear radiation or other adverse condition; to provide a bistable circuit having a feedback loop from a memory element for returning the circuit to its last state; to provide a circuit having a gate to inhibit inputs to a flip-flop circuit, a detector circuit to sense radiation and control the gate, and a feedback loop for returning the circuit to its last state; and to provide a circuit for use in a system having a multiple of bistable elements for returning the bistable elements to their last state after an adverse condition.

DESCRIPTION OF THE DRAWINGS

The specific nature of the invention, as well as other objects, uses and advantages thereof, will clearly appear from the following description and from accompanying drawings in which:

FIG. 2 is a circuit diagram of a bistable memory circuit employing a feedback loop which provides for recovery of the circuit to the state before interference;

FIG. 6 is a diagram of a circuit for producing the detection inputs;

FIG. 7 is a graph showing the waveforms for normal operation of the circuit of FIG. 5;

Like numbers designate like elements throughout the drawings.

DESCRIPTION OF PREFERRED EMBODIMENT

Figure 1:
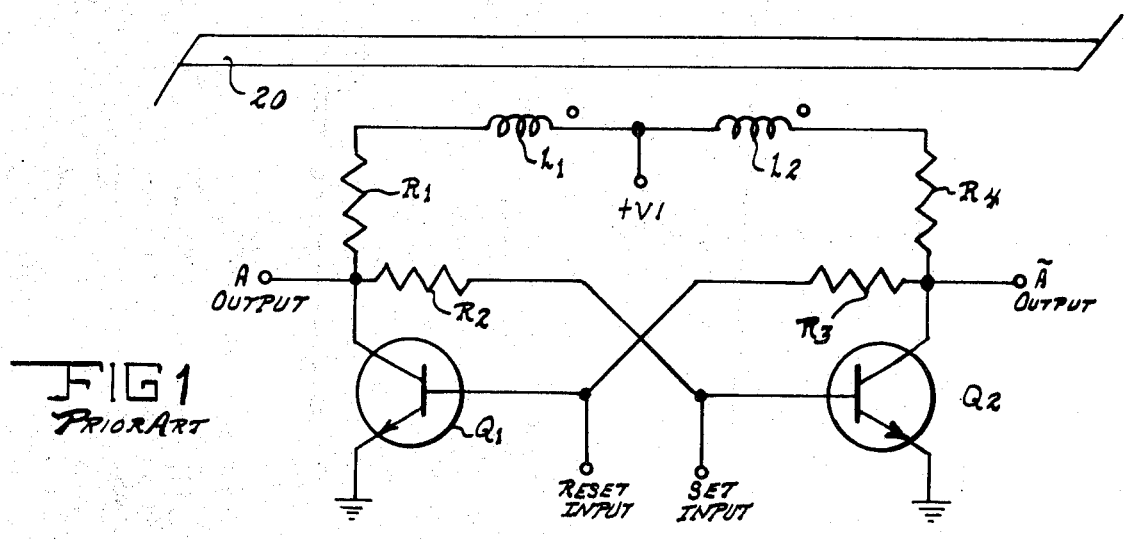
FIG. 1 is a circuit diagram of a prior art conventional bistable memory circuit or flip-flop driving a square loop memory core.

As shown in FIG. 1, a conventional bistable memory circuit comprises two transistors Q1, Q2 having their emitters grounded. The base of transistor Q2 receives the set input and is connected through resistor R2 to the collector of transistor Q1 while the base of transistor Q1 receives the reset input and is connected through resistor R3 to the collector of transistor Q2. The collector of transistor Q1 is connected through resistor R1 to one end of a winding L1 wound around the memory element 20. The other end of winding L1 is connected to a source of positive direct current potential V1. The collector of transistor Q2 is connected through resistor R4 to one end of a winding L2 wound around the memory element 20. The other end of winding L2 is connected to potential V1. Memory element 20 is preferably a core made of rectangular hysteresis material. Windings L1, L2 are oppositely wound so as to drive the element 20 to opposite states of saturation whenever their respective transistors Q1, Q2 conduct. In operation a set input causes transistor Q2 to conduct which drives memory element 20 to a first state of saturation by current flowing through winding L2. The circuit is then in a "1" or set state. A reset input causes transistor Q1 to conduct which lowers the voltage at the collector of transistor Q1 and thereby at the base of transistor Q2 causing it to shut off. The memory element 20 is driven to an opposite state of saturation by the current flowing through winding L1. The circuit is then in a "0" or reset state.

During a power failure neither transistor Q1, Q2 conducts. Upon resumption of power, it is possible that the bistable circuit will go to an arbitrary state which is opposite to the state of the circuit before power failure. This would drive memory element 20 to the opposite state and thereby lose the stored information. During a nuclear radiation pulse, both transistors Q1, Q2 tend to conduct. However, if both transistors conduct, the core drive flux is zero due to cancellation of winding flux and the stored information is protected so long as the winding currents are approximately equal. After the radiation subsides the bistable circuit will relax to an arbitrary state which may not in general be the state of the circuit before radiation. This change of state drives the memory element 20 to the opposite state and thereby loses the stored information.

In accordance with the invention, the above problems are solved by designing the bistable circuit so it will return to a preferred state after the temporary power failure or nuclear radiation interference and including a feedback loop which operates to change the state of the bistable circuit only if the preferred state is not the state of the circuit before interference.

Referring now to FIG. 2, a first embodiment is shown wherein the basic bistable circuit has a means to recover to a preferred state and a feedback loop connected from the memory element to the reset input. The feedback loop contains a winding L3 connected at one end to ground, wound around memory element 20 and connected at its other end to resistor R5 of an integrator network also containing capacitor C2 and resistor R6. The other end of the integrator network is connected to the base of transistor Q3. The emitter of transistor Q3 is grounded and the collector is connected to the reset input and base of transistor Q1. A capacitor C1 is connected between the base of transistor Q1 and ground and forms the means to recover the bistable circuit to a preferred state. In the embodiment shown the preferred state is the "O" or reset state of the bistable circuit. However, the circuit could be changed to have the preferred state be the "1" or set state of the bistable circuit by reversing the connections of winding L3 and attaching the collector of transistor Q3 and capacitor C1 to the set input in place of the reset input.

Figure 3:
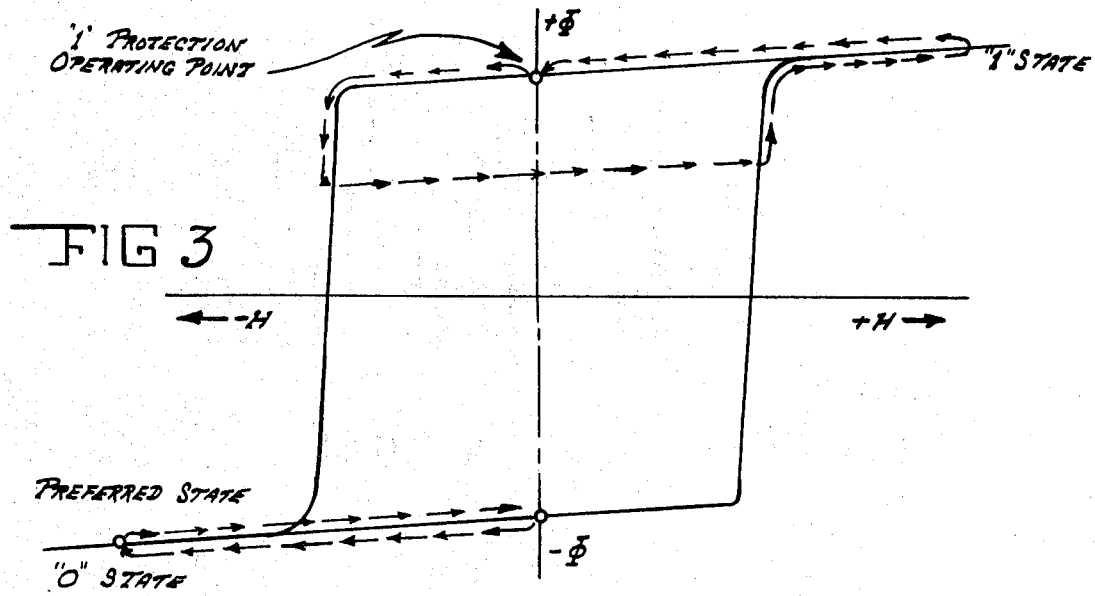
FIG. 3 is a rectangular hysteresis curve for the square loop core used in the art.

Operation of the circuit of FIG. 2 after adverse interference will now be explained with reference also being made to the hysteresis curve of FIG. 3. Upon removal of the radiation, the bistable circuit goes to the preferred state which, in this circuit, is the "O" or reset state where transistor Q1 is conducting due to capacitor C1.

If the preferred state is not the same as the state stored in memory element 20, a relatively wide voltage pulse will occur at feedback winding L3 indicating that core switching is taking place. This voltage pulse is applied through integrator network R5, C2, R6 to drive transistor Q3. With transistor Q3 conducting the base of transistor Q1 becomes effectively grounded causing transistor Q1 to shut off and transistor Q2 to conduct. This changes the state of the bistable circuit to the state stored in memory element 20 which is the state of the circuit before interferences. The arrows in the upper half of FIG. 3 show the variation of the hysteresis loop for recovery from a state other than the preferred state.

If the preferred state is the same as the state stored in memory element 20, a narrow voltage spike will occur at feedback winding L3 since there will be a relatively small flux change in the saturation state. The integrator network distinguishes between the voltage spike and the wide voltage pulse so that only a wide voltage pulse will trigger transistor Q3. As a result transistor Q3 is not turned on and the bistable circuit is allowed to recover to the preferred state which, in this example, is the state before interference. The arrows in the lower half of FIG. 3 show the variation of the hysteresis loop for recovery to the preferred state.

The circuit of FIG. 2 is especially useful for a permanent memory read out only unit where the flip-flop is placed in the set or reset state and not continually changed.

Certain problems arise when a multiple of flip-flops are used as in a system. For example, during the recovery it is desirable that the normal inputs, set, reset, to the flip-flop be inhibited so that the recovery state will not be effected by any normal set and reset voltages which may be present. When the system is subjected to nuclear radiation some of the flip-flops may go to the logically forbidden state where both output transistors conduct while other flip-flops may not, depending upon the distribution of hardness levels of such circuits. Obviously if the softest nonvolatile flip-flop in the system goes to the logically forbidden state, the system must wait until this flip-flop recovers before proceeding with the processing. Accordingly, it is inadvisable to allow each flip-flop to autonomously control the radiation level at which the inputs are inhibited.

Figure 4:
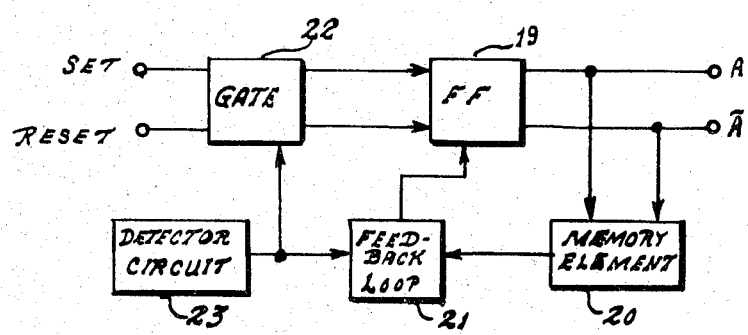
FIG. 4 is a block diagram of a modification of the present invention using a detector circuit.

FIG. 4 shows a block diagram of a scheme that allows for control of the inputs to the flip-flop from a single source. The flip-flop 19 drives memory element 20, and a feedback loop 21 is connected between memory element 20 and the flip-flop 19. The inputs to the flip-flop 19 are controlled by a gate 22 which itself is operated by detector circuit 23. The detector circuit 23 also disables feedback loop 21 during normal operation. It is to be understood that detector circuit detects when the radiation has exceeded a safe level and controls all nonvolatile flip-flops in the system.

Figure 5:
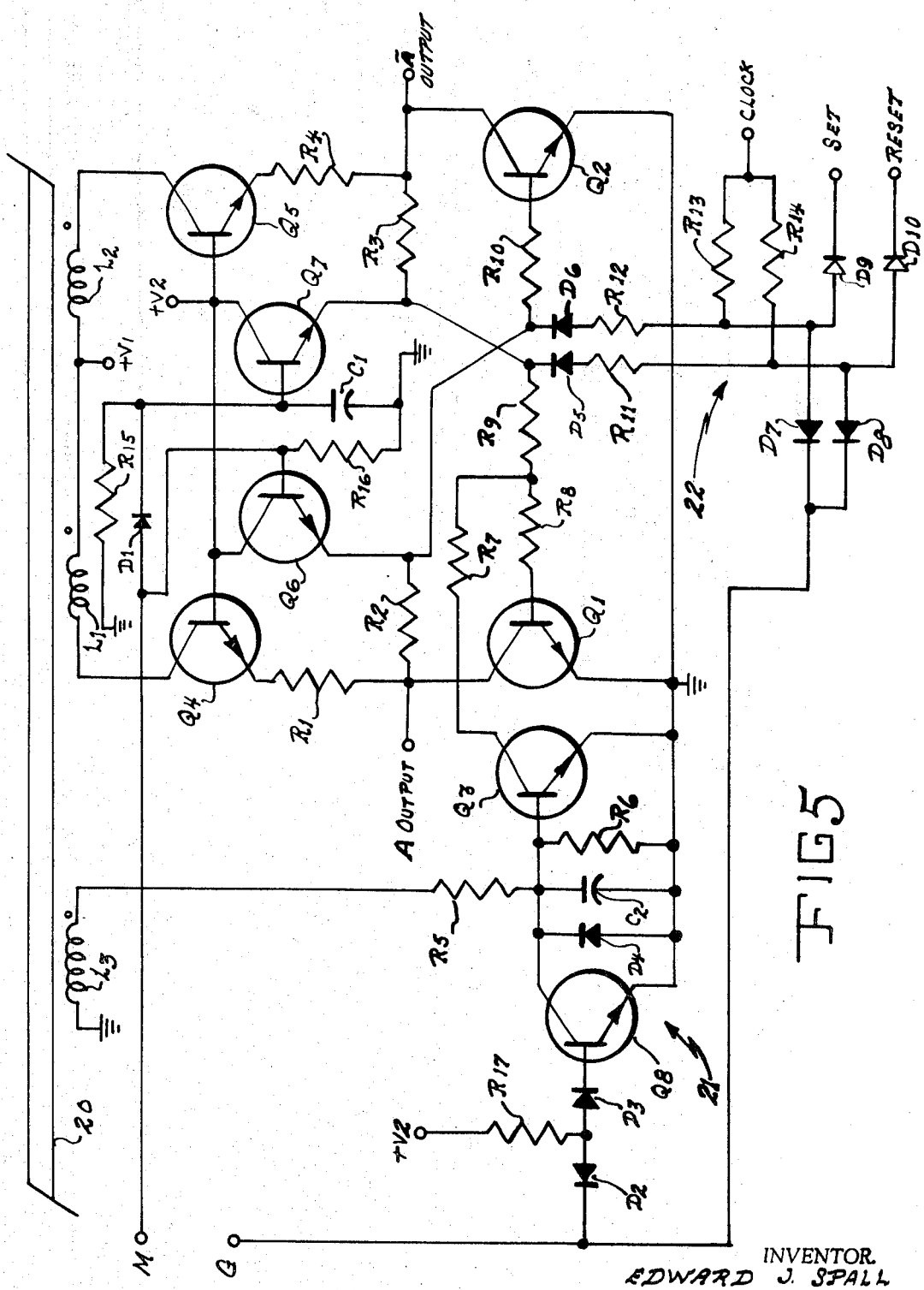
FIG. 5 is a circuit diagram implementing the modification of FIG. 4 but without the detection circuit.

Referring now to FIG. 5, a circuit is shown having five inputs. Three are normal flip-flop inputs (set, reset an clock). Input G is for gate and feedback loop control, and input M is to control the means whereby the flip-flop returns to a preferred state. The basic circuit of FIG. 3 has been expanded to include core driver transistors Q4, Q5 having their collectors connected to windings L1, L2 respectively, and their emitters connected to resistors R1, R4, respectively. The bases of core driver transistors Q4, Q5 are connected to a positive voltage V2. The addition of these transistors Q4, Q5 serves to stabilize the switching voltage and current pulse applied to core windings L1, L2, and also eliminates inductive switching noise from the output lines A and $\bar{A}$. The circuit also includes resistor R10 connected between the base of transistor Q2 and the set input from gate 22 and resistors R8, R9 serially connected between the base of transistor Q1 and the reset input from gate 22. An additional resistor R7 is connected from the collector of transistor Q3 to the juncture of resistors R8, R9.

The feedback loop is controlled by transistor Q8 having its collector connected to the base of transistor Q3 and its emitter grounded. The base of transistor Q8 is connected to the cathode of diode D3 which has its anode connected through resistor R17 to positive voltage V2, for biasing transistor Q8 on. The anode of diode D3 is also connected to the anode of diode D2 which has its cathode connected to gate and feedback control input G, thereby controlled the bias applied to the base of transistor Q8. Input G is normally at positive V2, thus transistor Q8 is on thereby holding transistor Q3 off and preventing the feedback loop from interfering with normal flip-flop operation.

The input gate 22 consists of diodes D5 through D10 and resistors R11 through R14. Since gate and feedback control input G is normally at voltage V2, the input gate 22 is allowed to pass information on the presence of a positive clock signal to the flip-flop. Gates such as these are known in the art and a detailed explanation will not be given. It is sufficient to know that as long as input G is at positive voltage V2, the flip-flop will receive inputs upon the presence of a set or reset input and a clock signal.

The means to recover the flip-flop to a preferred state contains transistors Q6, Q7 having their emitters connected to resistors R2, R3, respectively, and their collectors connected to voltage V2. The base of transistor Q6 is connected to input M and to resistor R16 grounded at its opposite end. Transistor Q7 is connected at its base to the cathode of diode D1 which has its anode connected to input M. A parallel resistive capacitive network C1, R15 is connected between the base of transistor Q7 and ground. In normal operation, input M is at ground biasing transistors Q6, Q7 off whereby as such they have no effect on the operation of the flip-flop.

Referring to FIG. 6, a circuit is shown which may be used to produce the gate and feedback control input G and input M from a radiation detector. Transistor Q11 is connected at its emitter to positive voltage V2 and at its collector to the anode of diode D11 and to resistor R23 which is grounded at its opposite end. The base of transistor Q11 receives the radiation detector input through resistor R22 and is also connected through resistor R21 to voltage V2. The cathode of diode D11 is connected to capacitor C11 and resistor R24 which is connected at its opposite end to the base of transistor Q12 and resistor R25. The emitter of transistor Q12 is grounded and the collector is connected through resistor R26 to positive voltage V2. The input M is taken from the collector of transistor Q11 and the input G is taken from the collector of transistor Q12. In normal operation neither transistor Q11 or Q12 is conducting and therefore input M is effectively grounded and input G is effectively voltage V2. To provide the detector input any radiation detector may be used and such detectors are known in the art. The only requirement is that the detector produce an output to trigger transistor Q11 to conduct.

Normal operation of the circuit of FIG. 5 will now be explained in conjunction with the waveforms shown in FIG. 7. Input M is at ground potential, biasing transistors Q6 and Q7 off so they have no effect on the circuit. Input G is at positive voltage V2 biasing transistor Q8 on thereby holding transistor Q3 off so the feedback loop has no effect. Gate 22 is also held open by the positive voltage V2 of input G so information can pass to the flip-flop. As shown in FIG. 7, upon receipt of a positive pulse at the set input, transistor Q2 conducts which grounds the $\bar{A}$ output thereby shutting off transistor Q1 which allows the A output to go positive shutting off core driver Q4. The $\bar{A}$ output going to ground potential allows core driver Q5 to conduct, thereby switching the magnetic orientation of memory element 20. During this period of switching a voltage is induced in winding L1 causing the voltage at the collector of transistor Q4 to rise until the switching is completed. Upon receipt of a reset pulse transistor Q1 is turned on and transistor Q2 is shut off thus reversing the voltage levels of the A and $\bar{A}$ outputs. As a result core driver Q4 is turned on and core driver Q5 shut off. As core driver Q4 conducts the magnetic orientation of memory element 20 reverses and a voltage drop occurs across winding L1 until memory element switching is complete.

Figure 8:
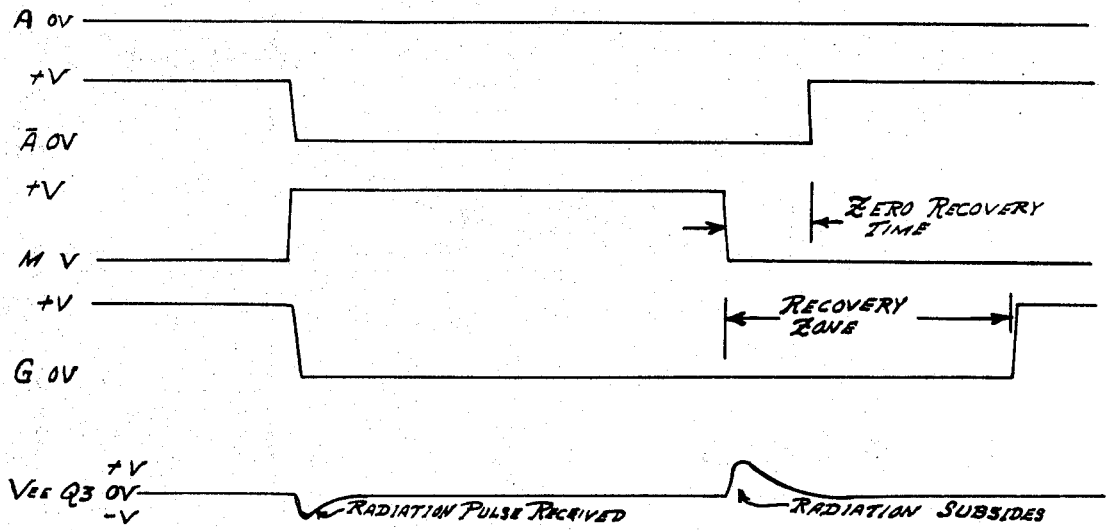
FIG. 8 is a graph showing waveforms for recovery of the circuit of FIG. 5 to the "O" or reset state of operation.

Referring to FIGS. 5, 6 and 8 a recovery of the circuit to the "0" or reset state after irradiation will now be explained. In the "0" state transistors Q1 and Q4 are conducting. In the event of a radiation burst, all transistors in the flip-flop will tend to conduct. Upon receipt of radiation at detector 23, a detector input will trigger transistor Q11 on which turns on transistor Q12. As a result input M goes to voltage V2 biasing transistors Q6 and Q7 on and input G goes to ground potential and biasing transistor Q8 off where transistor Q3 may conduct. Input G thus closes feedback loop 21 and also inhibits gate 22 from passing any input signals to the flip-flop by grounding the cathodes of diodes D7, D8. Resistors R7, R8, R9 insure that transistor Q1 will receive sufficient base current to remain saturated even in the event of radiation-induced saturation of transistor Q3. Upon the radiation subsiding the detector input is removed and transistor Q11 shuts off whereby input M goes to ground. Transistor Q12 remains conducting for an additional period due to the capacitor C11 resistor R24 combination. With input M at ground transistors Q6 and Q7 are biased off, however, transistor Q7 remains on for an additional period because of capacitor C1. Thereby the flip-flop tends to return to the preferred state where transistor Q1 conducts which is the "0" or reset state. Since this was the state before radiation there is little flux change in memory element 20 and no wide feedback pulse is produced to trigger transistor Q3 to reverse the flip-flop. The flip-flop goes to the "0" state. Transistor Q12 will stop conducting after capacitor C11 discharges sending input G to positive voltage V2 thereby opening the feedback loop and closing gate 22. The flip-flop is then in the state having transistors Q1 and Q4 conducting as before radiation.

Figure 9:
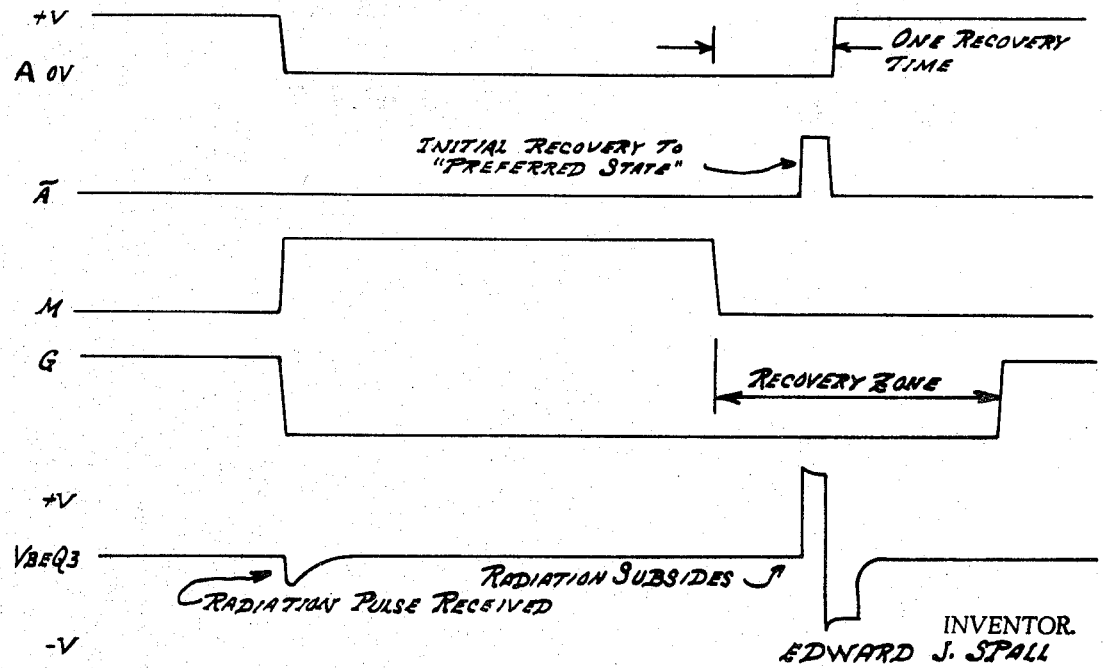
FIG. 9 is a graph showing waveforms for recovery of the circuit of FIG. 5 to the "1" or set state of operation.

Referring to FIG. 9 in conjunction with FIGS. 5 and 6, in the "1" or set state transistors Q1, Q5 are conducting. Upon receipt of a radiation detector input transistors Q11, Q12 conduct sending input M to voltage V2 and input G to ground. Thus transistors Q6, Q7 are biased on, the feedback loop 21 is biased closed, and gate 22 is inhibited from passing information. Upon the radiation subsiding the detector input is removed and transistor Q11 shuts off sending input M to ground potential. Transistors Q6 and Q7 are biased off, however, due to capacitor C1 transistor Q7 remains on for an additional period causing the flip-flop to go to the preferred state where transistor Q1 conducts which is the "0" or reset state. Since this is not the state stored in memory element 20, there is a large flux change resulting in a wide feedback pulse from winding L3 causing transistor Q3 to turn on whereby transistor Q1 is turned off. The flip-flop then goes to the "1" or set state where transistors Q2, Q5 are conducting. Transistor Q12 turns off due to the charge being drained from capacitor C11 and the circuit is in the same state as before the radiation.

It is to be understood that various modifications can be made in construction and arrangement within the scope of the invention therefore I intend to be limited only by a broad interpretation of the following claims.

I claim:

1. A memory circuit comprising in combination: a flip-flop circuit having inputs and including a memory element for storing the state of the flip-flop, means connected to one of said inputs for recovering said flip-flop to a preferred state after adverse interference, a feedback loop from said memory element to one of said inputs for sensing whether said preferred state is the same as the state stored in said memory element before interference, whereby said feedback loop will change the state of said flip-flop if the preferred state is not the same as the state stored in said memory element before interference.

2. A memory circuit according to claim 1 wherein said feedback loop is connected to the same input as said means for recovering said flip-flop to a preferred state.

3. A memory circuit in accordance with claim 1 wherein said memory element is a core made of rectangular hysteresis material, said feedback loop includes a winding wound around said core, an integrator network connected at one end to said winding, and a transistor having its base connected to said integrator and its collector connected to one of said inputs.

4. A memory circuit according to claim 1 wherein said means for recovering said flip-flop to a preferred state is a capacitor.

5. A memory circuit according to claim 1 including a detector circuit connected to said feedback loop for detecting radiation and closing said feedback loop.

6. A memory circuit according to claim 1 including a gate connected to said flip-flop so as to control the inputs, a detector circuit for detecting radiation, said detector circuit connected to said gate and said feedback loop whereby upon receipt of radiation the gate is inhibited from passing inputs to the flip-flop and said feedback loop is closed.

7. A memory circuit according to claim 6 wherein said memory element is a core of rectangular hysteresis material, said flip-flop includes two windings oppositely wound around said core, and two core drivers connected to said windings.

8. A memory element according to claim 7 wherein said feedback loop includes a feedback winding wound around said core, an integrator network connected to said feedback winding and a transistor having its base connected to said integrator and its collector connected to said flip-flop.